United States Patent
Gill et al.

(10) Patent No.: US 10,088,697 B2
(45) Date of Patent: Oct. 2, 2018

(54) DUAL-USE ELECTRO-OPTIC AND THERMO-OPTIC MODULATOR

(71) Applicant: International Business Machines Corporation, Armonk, NY (US)

(72) Inventors: Douglas M. Gill, South Orange, NJ (US); Jonathan E. Proesel, Mount Vernon, NY (US); Jessie C. Rosenberg, Mount Vernon, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/645,568

(22) Filed: Mar. 12, 2015

(65) Prior Publication Data

US 2016/0266414 A1    Sep. 15, 2016

(51) Int. Cl.
*G02F 1/01* (2006.01)
*G02F 1/025* (2006.01)

(52) U.S. Cl.
CPC ............ *G02F 1/011* (2013.01); *G02F 1/0147* (2013.01); *G02F 1/025* (2013.01)

(58) Field of Classification Search
CPC ......... G02F 1/011; G02F 1/0147; G02F 1/025
See application file for complete search history.

(56) References Cited

U.S. PATENT DOCUMENTS

| | | | |
|---|---|---|---|
| 5,867,990 A * | 2/1999 | Ghoshal | F25B 21/02 165/185 |
| 6,034,977 A * | 3/2000 | St. Pierre | H01S 3/042 372/29.01 |
| 6,278,168 B1 | 8/2001 | Day | |
| 6,430,936 B1 * | 8/2002 | Ghoshal | F25B 23/00 62/3.7 |
| 6,563,966 B1 | 5/2003 | Tang | |
| 6,665,105 B2 * | 12/2003 | Wipiejewski | G02F 1/011 359/240 |
| 6,766,083 B2 * | 7/2004 | Bona | G02B 6/12007 385/32 |
| 6,985,644 B2 * | 1/2006 | Andersen | H01S 5/0687 385/12 |
| 7,039,258 B2 * | 5/2006 | Gunn, III | G02F 1/025 385/1 |

(Continued)

FOREIGN PATENT DOCUMENTS

| | | |
|---|---|---|
| CN | 102224444 A | 10/2011 |
| JP | 07270632 A * | 10/1995 |

OTHER PUBLICATIONS

University of Wisconsin—Madison, ECE 600 Seminar (NPL—overview of a fully integrated CMOS-compatible RF-photonic system on a chip, 2011; "Wisconsin") available at https://www.engrwisc.edu/cmsdocuments/ECE_600_seminar_abstract_and_bio_pdf_11.7.pdf.*

(Continued)

*Primary Examiner* — Peter Radkowski
(74) *Attorney, Agent, or Firm* — Tihon Poltavets

(57) ABSTRACT

A dual-use thermal and electro-optic modulator. A thermal adjustment hardware set and an electric-field adjustment hardware set adjust the thermal and electrostatic properties of a common waveguide area. The hardware sets are electrically coupled. Signals for each type of modulation are conducted to the waveguide through a shared portion of a communication medium.

14 Claims, 5 Drawing Sheets

(56) References Cited

U.S. PATENT DOCUMENTS

| | | | | |
|---|---|---|---|---|
| 7,161,726 B2* | 1/2007 | Bintz | ............... | G02F 1/3134 359/254 |
| 7,286,726 B1* | 10/2007 | Keil | ............... | G02F 1/0121 385/1 |
| 7,308,160 B2 | 12/2007 | Gill et al. | | |
| 7,333,679 B2 | 2/2008 | Takahashi | | |
| 7,356,221 B2* | 4/2008 | Chu | ............... | G02B 6/12007 385/16 |
| 7,450,787 B2* | 11/2008 | Kucharski | ............... | G02F 1/025 385/2 |
| 7,639,723 B2* | 12/2009 | Yamazaki | ............... | G02B 6/12007 372/20 |
| 7,688,872 B2* | 3/2010 | Chen | ............... | H01S 5/0687 372/29.01 |
| 7,715,663 B2* | 5/2010 | Carothers | ............... | G02F 1/225 385/3 |
| 7,805,026 B2 | 9/2010 | Gill | | |
| 7,848,601 B2* | 12/2010 | Carothers | ............... | G02F 1/225 385/3 |
| 8,054,669 B2* | 11/2011 | Meijer | ............... | G02F 1/011 365/114 |
| 8,098,968 B2 | 1/2012 | Green et al. | | |
| 8,111,730 B2* | 2/2012 | Budd | ............... | G02B 6/4201 372/36 |
| 8,299,608 B2* | 10/2012 | Bartley | ............... | H01L 23/055 257/712 |
| 8,411,719 B2* | 4/2013 | Budd | ............... | G02B 6/4201 372/34 |
| 8,483,253 B2* | 7/2013 | Budd | ............... | G02B 6/4201 372/34 |
| 8,532,441 B2* | 9/2013 | Rasras | ............... | B29D 11/00663 372/20 |
| 8,582,937 B2* | 11/2013 | Xu | ............... | G02F 1/025 385/50 |
| 8,588,556 B1* | 11/2013 | Dong | ............... | G02F 1/025 359/237 |
| 8,655,114 B2* | 2/2014 | Popovic | ............... | G02B 6/12007 385/1 |
| 8,824,036 B2* | 9/2014 | Manipatruni | ............... | G02F 1/011 359/239 |
| 9,134,169 B2* | 9/2015 | Li | ............... | G01J 1/0209 |
| 2002/0092307 A1* | 7/2002 | Ghoshal | ............... | H01L 23/38 62/3.7 |
| 2002/0166839 A1* | 11/2002 | Ghoshal | ............... | H01L 35/16 216/11 |
| 2002/0172820 A1* | 11/2002 | Majumdar | ............... | C08J 5/18 428/323 |
| 2002/0175408 A1* | 11/2002 | Majumdar | ............... | H01L 24/16 257/734 |
| 2003/0025976 A1* | 2/2003 | Wipiejewski | ............... | G02F 1/011 359/240 |
| 2003/0142928 A1* | 7/2003 | Hirata | ............... | G02B 6/4201 385/92 |
| 2003/0202548 A1* | 10/2003 | Andersen | ............... | H01S 5/0687 372/20 |
| 2003/0206676 A1* | 11/2003 | Ovadia | ............... | G02B 6/12007 385/11 |
| 2004/0223677 A1* | 11/2004 | Park | ............... | G02B 6/1221 385/1 |
| 2006/0098910 A1* | 5/2006 | Bintz | ............... | G02F 1/3134 385/2 |
| 2006/0198415 A1* | 9/2006 | Yamazaki | ............... | G02B 6/12007 372/94 |
| 2007/0206899 A1* | 9/2007 | Chu | ............... | G02B 6/12007 385/32 |
| 2007/0230854 A1* | 10/2007 | Felix Keil | ............... | G02F 1/0121 385/1 |
| 2007/0280576 A1* | 12/2007 | Kucharski | ............... | G02F 1/025 385/1 |
| 2008/0295879 A1* | 12/2008 | Atanackovic | ............... | H01L 35/22 136/238 |
| 2009/0092350 A1* | 4/2009 | Gill | ............... | G02F 1/225 385/3 |
| 2009/0238557 A1* | 9/2009 | Chen | ............... | H01S 5/0687 398/16 |
| 2009/0277608 A1* | 11/2009 | Kamins | ............... | F25D 19/006 165/82 |
| 2010/0039848 A1* | 2/2010 | Meijer | ............... | G02F 1/011 365/114 |
| 2010/0053712 A1* | 3/2010 | Carothers | ............... | G02F 1/225 359/108 |
| 2010/0157402 A1* | 6/2010 | Carothers | ............... | G02F 1/225 359/108 |
| 2010/0209038 A1* | 8/2010 | Popovic | ............... | G02B 6/12007 385/1 |
| 2010/0322569 A1* | 12/2010 | Ohyama | ............... | G02B 6/12019 385/92 |
| 2011/0044367 A1* | 2/2011 | Budd | ............... | G02B 6/4201 372/50.21 |
| 2011/0058765 A1* | 3/2011 | Xu | ............... | G02F 1/025 385/2 |
| 2011/0103415 A1* | 5/2011 | Rasras | ............... | B29D 11/00663 372/29.011 |
| 2011/0235962 A1* | 9/2011 | Shubin | ............... | G02B 6/12007 385/14 |
| 2012/0007229 A1* | 1/2012 | Bartley | ............... | H01L 23/055 257/712 |
| 2012/0062974 A1* | 3/2012 | Manipatruni | ............... | G02F 1/011 359/238 |
| 2012/0087659 A1* | 4/2012 | Gill | ............... | H04B 10/572 398/49 |
| 2012/0120976 A1* | 5/2012 | Budd | ............... | G02B 6/4201 372/34 |
| 2012/0120978 A1* | 5/2012 | Budd | ............... | G02B 6/4201 372/50.21 |
| 2013/0121631 A1* | 5/2013 | Yu | ............... | G02F 1/0134 385/2 |
| 2013/0223793 A1* | 8/2013 | Kim | ............... | G02B 6/3596 385/18 |
| 2014/0003761 A1* | 1/2014 | Dong | ............... | G02F 1/2257 385/3 |
| 2014/0023309 A1* | 1/2014 | Jiang | ............... | G02F 1/3133 385/3 |
| 2014/0110572 A1* | 4/2014 | Li | ............... | G01J 1/0209 250/227.23 |

OTHER PUBLICATIONS

Rutgers—The State University of New Jersey—Institute for Advanced Materials, Devices and Nanotechnology (NPL Resonator-Based CMOS Compatible Thermo-optic Filters and Electro-optic Modulators, 2008; "Rutgers") available at http://iamdn.rutgers.edu/events/workshops/32-events/seminars-2008/1730-resonator-based-cmos-compatible-thermo-optic-filter.*

Manipatruni et al. (NPL—Wide temperature range operation of micrometer scale silicon electro-optic modulators; Optics Letters, V. 33. N. 19, p. 21, 2008; "Manipatruni").*

Yu et al. (NPL—Compact Thermally Tunable Silicon Racetrack Modulators Based on an Asymmetric Waveguide, Photonics Technology Letters, V. 25, N. 2, p. 159, 2013; "Yu").*

Chowdhury et al. (NPL—On-chip cooling by superlattice-based thin-film thermoelectrics, Nature Nanotechnology 4, 235-238 (2009) Published online: Jan. 25, 2009 | doi:10.1038/nnano.2008.417; "Chowdhury").*

Spector et al. (NPL—Integrated Optical Components in Silicon for High Speed Analog-to-Digital Conversion; Silicon Photonics II, edited by Joel A. Kubby, Graham T. Reed, Proc. of SPIE vol. 6477, (2007); "Spector").*

Internet Archive, Crawl History, https://www.engrwisc.edu/cmsdocuments/ECE_600_seminar_abstract_and_bio_pdf_11.7.pdf; available at https://web.archive.org/web/20111001000000*/https://www.engrwisc.edu/cmsdocuments/ECE_600_seminar_abstract_and_bio_pdf_11.7.pdf.*

Chen et al. (NPL—First-principles analysis of photocurrent in graphene PN junctions, Phys. Rev. B 85, 155441—Published Apr. 23, 2012; "Chen").*

(56) References Cited

OTHER PUBLICATIONS

Han et al. (NPL—Graphene radio frequency receiver integrated circuit, Nature Communications vol. 5, Article No. 3086, 2014; "Han").*

Kim et al. (NPL—Thermo-optic mode extinction modulator based on graphene plasmonic waveguide, Opt. Express 21, 15280-15286 (2013); "Kim").*

Li et al. (NPL—Silicon waveguide modulator based on carrier depletion in periodically interleaved PN junctions, Optics Express, V. 17, N. 18, 15947, 2009; "Li").*

Schall et al. (NPL—50 GBit/s Photodetectors Based on Wafer-Scale Graphene for Integrated Silicon Photonic Communication Systems, ACS Photonics 2014 1 (9), 781-784; "Schall").*

Lu et al. (NPL—Nanoscale electro-optic modulators based on graphene-slot waveguides, J. Opt. Soc. Am. B 29, 1490-1496 (2012); "Lu").*

Barrios et al., Electrooptic modulation of silicon-on-insulator submicrometer-size waveguide devices, In Journal of Lightwave Technology, vol. 21, No. 10, pp. 2332-2339, Oct. 2003.*

Li et al., 25Gb/s 1V-driving CMOS ring modulator with integrated thermal tuning, Opt. Express 19, 20435-20443 (2011).*

M. Lipson, Compact Electro-Optic Modulators on a Silicon Chip, In IEEE Journal of Selected Topics in Quantum Electronics, vol. 12, No. 6, pp. 1520-1526, Nov.-Dec. 2006.*

Manipatruni et al., Wide temperature range operation of micrometer-scale silicon electro-optic modulators, Opt. Lett. 33, 2185-2187 (2008).*

H. Yu et al "Compact Thermally Tunable Silicon Racetrack Modulators Based on an Asymmetric Waveguide," In IEEE Photonics Technology Letters, vol. 25, No. 2, pp. 159-162, Jan. 15, 2013.*

L. O'Faolain, D. M. Beggs, T. P. White, T. Kampfrath, K. Kuipers and T. F. Krauss, "Compact Optical Switches and Modulators Based on Dispersion Engineered Photonic Crystals," In IEEE Photonics Journal, vol. 2, No. 3, pp. 404-414, Jun. 2010.*

Yu et al., Silicon dual-ring modulator driven by differential signal, Nov. 15, 2014 / vol. 39, No. 22 / Optics Letters 6379.*

Xiong et al., A linear push-pull silicon optical modulator, Frontiers in Optics, Paper FM3A.4, FiO/LS 2014, OSA, 2014.*

Li et al.,25Gb/s 1V-driving CMOS ring modulator with integrated thermal tuning, Opt. Express 19, 20435-20443 (2011).*

Manipatruni et al., Wide temperature range operation of micrometer scale silicon electro-optic modulators; Optics Letters, V. 33. N. 19, p. 21, 2008.*

Assefa et al., "A 90nm CMOS Integrated Nano-Photonics Technology for 25Gbps WDM Optical Communications Applications", 2012 IEEE International Electron Devices Meeting (IEDM), Dec. 10-13, 2012, San Francisco, CA, DOI: 10.1109/IEDM.2012. 6479162, pp. 33.8.1-33.8.3.

Coppinger et al., "Photonic Microwave Filtering Using Coherently Coupled Integrated Ring Resonators", Microwave and Optical Technology Letters / vol. 21, No. 2, Apr. 20 1999, pp. 90-93.

IBM, "Made in IBM Labs: IBM Lights Up Silicon Chips to Tackle Big Data", IBM News room—Dec. 10, 2012, p. 1 of 4, San Francisco, CA.

Li et al., "High-efficiency 25Gb/s CMOS ring modulator with integrated thermal tuning", 2011 8th IEEE International Conference on Group IV Photonics (GFP), Sep. 14-16, 2011, London, pp. 8-10, doi: 10.1109/GROUP4.2011.6053698.

Li et al., "Ring Resonator Modulators in Silicon for Interchip Photonic Links", IEEE Journal of Selected Topics in Quantum Electronics, vol. 19, No. 6, Nov./Dec. 2013.

Van Campenhout et al., "Integrated NiSi waveguide heaters for CMOS-compatible silicon thermo-optic devices", Apr. 1, 2010 / vol. 35, No. 7 / Optics Letters, pp. 1013-1015, © 2010 Optical Society of America.

Zortman et al., "Integrated CMOS Compatible Low Power 10Gbps Silicon Photonic Heater-Modulator", OFC/NFOEC Technical Digest © 2012 OSA.

"Nanophotonics", Wikipedia, the free encyclopedia, page last modified on Nov. 21, 2014, at 21:44.

"Silicon photonics", Wikipedia, the free encyclopedia, page last modified on Feb. 3, 2015, at 06:34.

Gill et al., "Electro-Optic and Thermo-Optic Modulator", International Application No. PCT/IB2016/051150, Filed on Mar. 2, 2016, 25 pages.

International Application No. PCT/IB2016/051150, Patent Cooperation Treaty PCT, International Searching Authority, Notification of Transmittal of the International Search Report and the Written Opinion of the International Searching Authority, or the Declaration; Patent Cooperation Treaty PCT International Search Report; Patent Cooperation Treaty PCT Written Opinion of the International Searching Authority; dated Jun. 20, 2016; 12 pages.

International Search Report with Written Opinion dated Jun. 20, 2016.

* cited by examiner

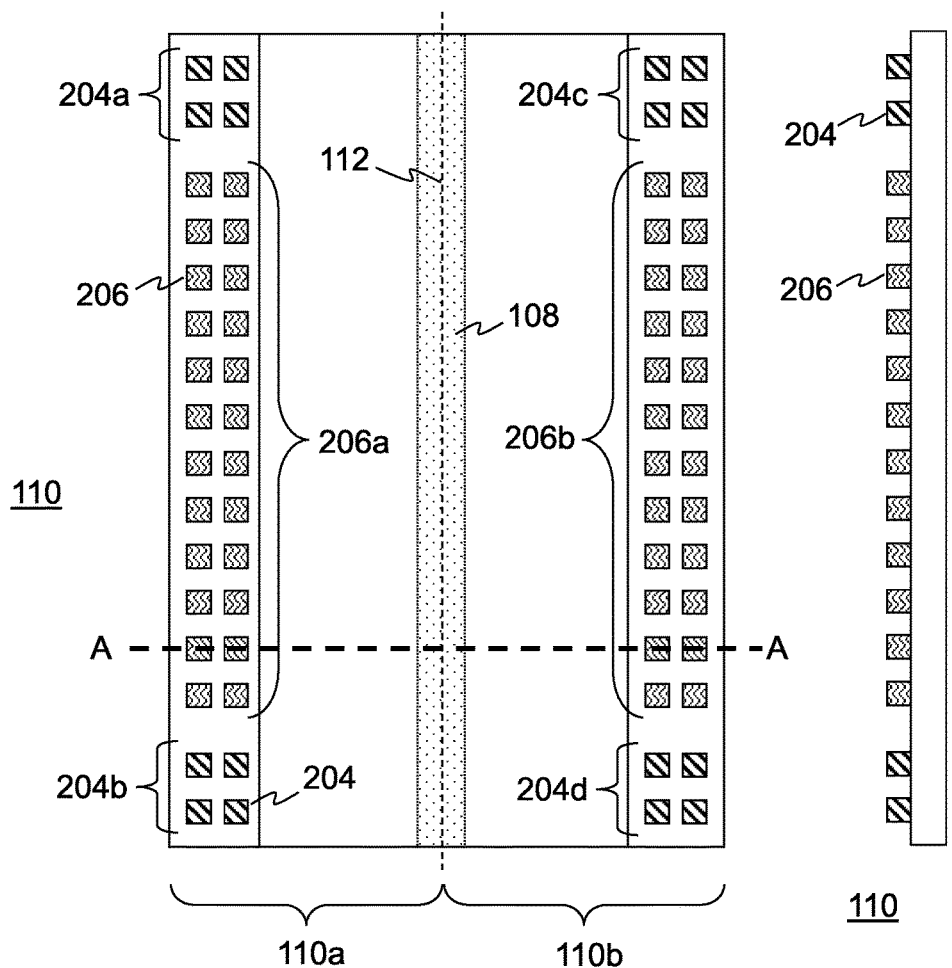
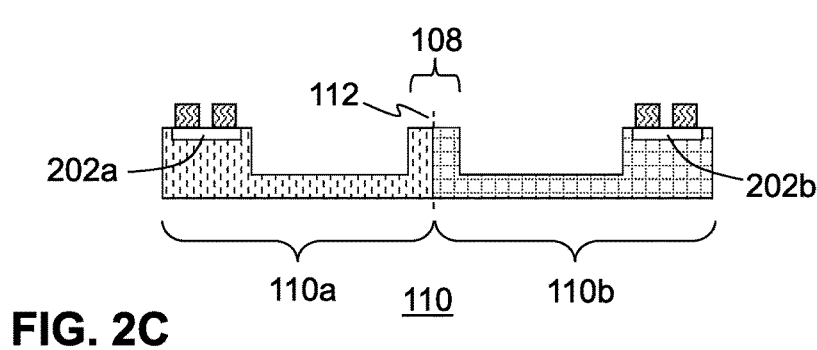
FIG. 2A  FIG. 2B
FIG. 2C

FIG. 3A   FIG. 3B

DUAL-USE ELECTRO-OPTIC AND THERMO-OPTIC MODULATOR

BACKGROUND OF THE INVENTION

The present invention relates generally to the field of nanophotonics, more particularly to electro-optic modulators in electro-optic integrated circuits, and even more particularly to mechanical and thermal design of electro-optic modulator hardware.

Nanophotonics involves the generation, emission, transmission, manipulation—such as by modulation, amplification, or switching—and detection of light at very short length scales. These length scales are typically in the nanometer or low micrometer range and shorter than the wavelength of the light involved. The light itself may lie anywhere along the electromagnetic spectrum, from near infra-red or lower frequency to ultraviolet or beyond, with near infra-red light being of particular current interest due to its widespread use as a data transmission medium for telecommunications.

Nanophotonics includes, but is not limited to, optical and electro-optical components of integrated circuits constructed in a complementary metal-oxide-semiconductor (CMOS) fabrication process, for which silicon is presently the most common basic building block. Such silicon nanophotonic components promise advancements in the speed, functionality, and power efficiency of integrated circuits while simultaneously leveraging the benefits of highly evolved CMOS fabrication technologies.

SUMMARY

According to an aspect of the present invention, there is a device that includes: (i) a waveguide structured, connected and/or located to communicate light; (ii) a first thermal adjustment hardware set structured, connected and/or located to heat and/or cool at least a first portion of the waveguide in a controlled manner; (iii) a first electric-field adjustment hardware set structured, connected and/or located to control an electric field in at least the first portion of the waveguide in a controlled manner; and (iv) thermal/electric-field communication medium material structured, connected and/or located to: (a) thermally communicate heating and/or cooling from the first thermal adjustment hardware set to the first portion of the waveguide, and (b) communicate electric field adjustments from the first electric-field adjustment set to the first portion of the waveguide. The first thermal adjustment hardware set and the first electric-field adjustment set are electrically coupled.

According to a further aspect of the present invention, there is a device for modulating light traveling along a waveguide, which device includes: (i) a waveguide structured, connected and/or located to communicate light; (ii) a first thermo-optic modulator structured, connected and/or located to modulate the light along at least a first portion of the waveguide; (iii) a first electro-optic modulator structured, connected and/or located to modulate the light along at least the first portion of the waveguide; and (iv) a communication medium material structured, connected and/or located to: (a) thermally communicate heating and/or cooling from the first thermo-optic modulator to the first portion of the waveguide, and (b) electrically communicate electric field adjustments from the first electro-optic modulator to the first portion of the waveguide. The first thermo-optic modulator generates heat by passing an electric current through the communication medium material. The first thermo-optic modulator and the first electro-optic modulator are electrically coupled.

According to a further aspect of the present invention, there is a device for modulating light traveling along a waveguide, which device includes: (i) a waveguide structured, connected and/or located to communicate light; (ii) a first thermo-optic modulator structured, connected and/or located to modulate the light along at least a first portion of the waveguide; and (iii) a first electro-optic modulator structured, connected and/or located to modulate the light along at least the first portion of the waveguide. The thermo-optic modulator and the electro-optic modulator are combined into a single, non-differentiated structure.

BRIEF DESCRIPTION OF THE DRAWINGS

FIG. 2A is an orthographic plan view of the portion of the first embodiment semiconductor structure;

FIG. 2B is an orthographic axial view of the portion of the first embodiment semiconductor structure;

FIG. 2C is a third transverse cross-sectional view of the portion of the first embodiment semiconductor structure;

FIG. 3A is an orthographic plan view of a second embodiment semiconductor structure according to the present invention;

FIG. 3B is an orthographic axial view of the second embodiment semiconductor structure;

DETAILED DESCRIPTION

Figure 1A:
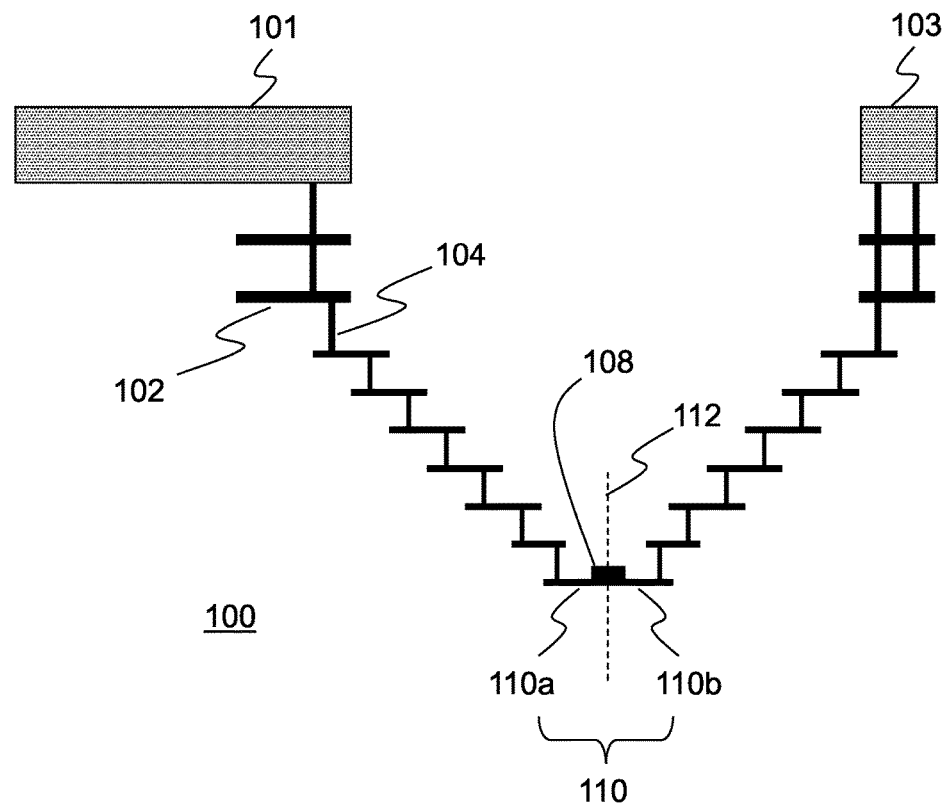
FIG. 1A is a first transverse cross-sectional view of a first embodiment semiconductor structure according to the present invention.

Some embodiments of the present invention modulate light propagating along a waveguide by application of thermo-optic modulation and electro-optic modulation along the same section of waveguide. Both types of modulation are produced by the same physically integrated structure through independent modulation actions. Signals for each type of modulation are conducted to the waveguide through a shared portion of a communication medium.

Some embodiments of the present invention recognize that silicon nanophotonic technologies, such as sub-100 nm technology for monolithic CMOS nanophotonics, may provide one or more of the following features, characteristics and/or advantages: (i) cost-effective, single-die wavelength division multiplexing (WDM) transceivers; (ii) dense integration of scalable, multi-channel, and/or wavelength multiplexing components; and/or (iii) components suitable for massive deployment that permit rapid communications covering ranges from centimeters or less to kilometers or more, such as chip-to-chip and rack-to-rack communication to, from, and/or within servers, data centers, and advanced computing systems.

Further, some embodiments of the present invention recognize: (i) that one operational class of nanophotonic structures is a thermo-optic phase shifter, or thermo-optic heater, which alters the phase of an optical wave as it passes through a medium by altering the refractive index of the medium via the application of heat; and (ii) that a second operational class of nanophotonic structures is an electro-optic phase shifter, which alters the phase of an optical wave as it passes through a medium by changing the optical properties of the medium via the application or manipulation of an electric field. Thermo-optic phase shifters are relatively slow to induce change in an optical wave but permit variation over a large tuning range without significant optical loss. They are therefore often used in CMOS-compatible photonic structures to calibrate, configure, or otherwise tune optical components in electro-optic integrated circuits. For example, thermo-optic heaters are used to control electro-optic transmitters by tuning operating wavelength, or tuning which part of the transmitter transfer function is used for modulation, to compensate for fabrication variations or external temperature drift during operation. On the other hand, electro-optic (EO) phase shifters, such as RF phase shifters, induce relatively fast changes in an optical wave (though conventionally over a relatively narrow range), so tend to be used for modulating an optical signal.

As used above, "range" corresponds to phase. Both electro-optic and thermo-optic phase shifters control the phase of light. Whether a phase change affects a resonance wavelength, coupling ratio, or other parameter depends on the type of structure into which the electro-optic or thermo-optic phase shifter is incorporated. When contained within an interferometer, such as a Mach-Zehnder interferometer (MZI) or ring resonator, changing the phase of the light can change the output optical intensity given a fixed laser wavelength (hence modulation). In a ring resonator structure, changing the phase, whether done electro-optically or thermo-optically, corresponds to a change in the resonance wavelength of the ring. Thermo-optic phase shifters in rings can be used to compensate for fabrication errors or temperature variations in wavelength, as stated above. MZI modulators are generally wavelength-independent, and thermo-optic phase shifters can be used to compensate for fabrication errors that result in phase imbalances between the two arms, or fabrication errors in the 50/50 couplers at the input and output of such interferometers.

The frequency range of lumped-element EO modulators based on reverse-biased diodes is limited by the resistor-capacitor (RC) time constants of the p-n junctions of the diodes, generally in the range from direct current (DC) to the tens of GHz, though some polymer-based traveling-wave MZI modulators, for example, have shown 100 GHz bandwidth. While EO modulation itself is a phase shift, that phase modulation can be translated into an amplitude modulation of the output light, depending on the setup of the modulator (ring, MZI). There is also a corresponding frequency shift in the light when a phase shift occurs. In general, therefore, modulators can produce amplitude, phase, and/or frequency modulation (or even polarization modulation).

Some embodiments of the present invention recognize: (i) that one functional class of nanophotonic devices is an optical transmitter modulator; (ii) that various operational classes of optical transmitter modulators exist, including but not necessarily limited to: (a) lumped resonant EO modulators, such as ring modulators (ring resonator modulators), (b) lumped EO Mach-Zehnder Interferometers (MZIs), and (c) traveling-wave MZIs; and (iii) that each operational class of modulators generally manifests a unique constellation of costs and benefits.

For instance, lumped resonant EO modulators (for instance, ring modulators) tend to possess: (i) a low required drive voltage; (ii) a small physical footprint; and (iii) medium-to-high bandwidth capability (25 Gb/s or greater operation has been shown); but also (iv) tend to have high temperature sensitivity, such that a heater is required for effective operation. Lumped EO MZIs, on the other hand, tend to have: (i) low temperature sensitivity (that is, they tend to be temperature stable); and (ii) a small physical footprint; but also (iii) a high required drive voltage; and (iv) a limited bandwidth. In contrast to both lumped resonant EO modulators and lumped EO MZIs, traveling-wave MZIs tend to exhibit: (i) a low required drive voltage; (ii) low temperature sensitivity; and (iii) a high bandwidth (25 Gb/s or greater operation has been shown); but also (iv) a large physical footprint.

Some embodiments of the present invention recognize: (i) that high bandwidth, high modulation efficiency, and low power consumption are desirable characteristics of optical modulators; (ii) that ring modulators are often desirable for their beneficial properties as described above; and (iii) that with respect to lumped-element resonant modulators (ring modulators) that include a radio-frequency (RF) phase shifter, bandwidth, modulation efficiency, and power consumption are determined as follows:

(a) Bandwidth: is determined by (1) the RC time constant and (2) optical lifetime. (1) A smaller C will produce a larger RC-limited bandwidth. A shorter RF phase shifter will result in a smaller C. When combined with a ring resonator, an RF phase shifter can be relatively short for a given modulation depth. This is because light travels around a ring resonator many times, passing through the same RF phase shifter region of the resonator many times and resulting in an effective RF phase shifter length that is much longer than the actual RF phase shifter length (see also modulation efficiency, below). (2) In addition, the more time the light spends in the active RF phase shifter region of the resonator during its optical lifetime, the larger the optical-lifetime-limited bandwidth will be. It is therefore desirable to have a greater percentage of resonator circumference composed of active RF phase shifter (as opposed to thermo-optic heater or simply passive waveguide), because a higher fill fraction of RF phase shifter within the resonator means the light will spend more time exposed to the active RF phase shifter during its multiple loops around the ring, thus effecting a larger optical-lifetime-limited bandwidth.

(b) Modulation efficiency: is determined by the effective RF phase shifter length, which in turn is determined by (1) the round-trip multiplier and (2) the fill fraction. (1) The round trip multiplier results from the resonant structure of a ring modulator. Because light travels around the ring many times before it decays, traveling through the same RF phase shifter region on each round trip, the effective RF phase shifter length can be expressed as N×L, where N is the number of round trips the light takes around the ring (the round-trip multiplier) and L is the physical phase shifter length. This resonant structure results in a resonant enhancement to the modulation efficiency of a ring modulator. (2) A higher fill fraction gives a longer effective RF phase shifter length by increasing L for a given size ring. Less optical loss takes place in non-active regions of the modulator (that is, as explained previously, the light spends a greater percentage of its time in the active RF phase shifter region of the ring), so, given a certain number of loops before optical decay, a higher fill fraction will also result in a longer effective RF phase shifter length.

(c) Power consumption: described by the equation $P=\frac{1}{4}CV^2$, is determined by (1) physical RF phase shifter length and (2) modulation efficiency. (1) as mentioned above, a shorter physical RF phase shifter length results in a smaller capacitance (C) and thus lower power (P), while (2) a higher modulation efficiency results in a smaller voltage (V) requirement, and thus lower power.

Based on the above, some embodiments of the present invention recognize that ring modulators benefit from having an RF phase shifter cover the largest possible fraction of the ring circumference, because a high (RF) phase shifter fill fraction results in the best bandwidth, modulation efficiency, and power consumption for a given size ring. They also recognize, however: (i) that in addition to an electro-optic phase shifter for high-speed modulation, ring modulators tend to require one or more thermo-optic phase shifters for tuning; (ii) that for performance purposes, it is desirable to place such thermo-optic phase shifters in close thermal proximity to the waveguide of the ring modulator; (iii) that as a result of (i) and (ii), an ideal ring modulator would have both thermo-optic phase shifters and RF phase shifters directly integrated into the ring waveguide structure; but (iv) that having separate thermo-optic phase shifters and RF phase shifters in ring modulators tends to make ring circumference larger in order to accommodate both phase shifters and, as such, reduces the fraction of the ring circumference that is covered by the high-speed RF phase shifter. This reduced fill fraction is detrimental to modulator performance as explained above (for example, because a larger drive voltage will be required to produce the same output signal characteristics).

Some embodiments of the present invention are therefore motivated to include a dual-use, combined RF and thermo-optic phase shifter. With respect to ring modulators, combining the thermo-optic and high-speed RF phase shifters into one structure may provide one or more of the following features, characteristics and/or advantages: (i) the RF phase shifter can cover a larger fraction of the ring circumference since a separate thermo-optic phase shifter is not needed; (ii) ring modulators can simultaneously be made more efficient and smaller by having the RF phase shifter cover a larger fraction of the ring circumference; and/or (iii) covering a larger fraction of the ring circumference can reduce the overall ring modulator size and required drive voltage for a given output depth of modulation, thereby improving performance.

Shown in FIG. 1A is a cross-sectional view of semiconductor structure 100 (not drawn to scale), illustrating an embodiment of the present invention in cross-sectional context. Semiconductor structure 100 includes: electrical interconnects 101-104, including top-level wiring 101 and 103, conductive layer paths 102, and conductive vias 104; and p-n junction 110, including n-doped wing 110a, p-doped wing 110b, and waveguide 108. Dashed line 112 shows the boundary between the n-doped and p-doped wings of the p-n junction. P-n junction 110 is formed in silicon on insulator (SOI), where a thin layer of insulator such as buried oxide (BOX) (not shown) sits below the silicon p-n junction and separates it from the silicon handle wafer (not shown).

Figure 1B:
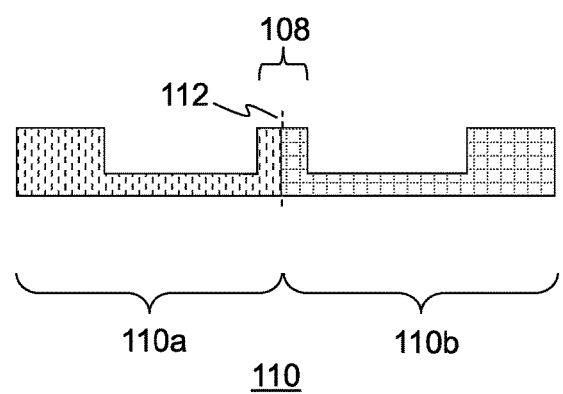
FIG. 1B is a second transverse cross-sectional view of a portion of the first embodiment semiconductor structure.

FIG. 1B shows a magnified view of p-n junction 110. In this embodiment the wings are symmetric, and the degree of doping decreases from the edges of each wing to the waveguide in the center. Those of ordinary skill in the art will recognize numerous possible variations, such as to dimensions, symmetry, doping levels, and boundary placement (horizontally, vertically, diagonally, interdigitated, and so on), depending on modulator design considerations.

Semiconductor structure 100 is a loaded RF electrode of a dual-use RF and thermo-optic phase shifter used in a ring modulator. The ring shape can be visualized by rotating p-n junction 110 perpendicular to the cross-sectional plane around a vertical axis passing through electrical interconnect 103. Varying the voltage between electrical interconnects 101 and 103 changes the free-carrier/optical overlap in waveguide 108 of p-n junction 110, thus modulating the phase of the light wave as it propagates through the waveguide in a direction perpendicular to the two-dimensional cross-sectional view.

Shown in FIGS. 2A, 2B, and 2C are plan, side, and cross-sectional views, respectively, of p-n junction 110, with the cross-section in FIG. 2C corresponding to cut line A-A in FIG. 2A. These three more detailed views include additional elements as follows: heater contact vias 204, including heater contact via groups 204a, 204b, 204c, and 204d; RF contact vias 206, including RF contact via groups 206a and 206b; and ohmic contacts 202a (N+) and 202b (P+) positioned under each via. FIG. 2A shows the top view as linear for convenience; however, it should be understood that because this embodiment is used in a ring modulator, it is actually arced in the plane of the view.

Heater via groups 204a and 204b are electrically connected to n-doped wing 110a of p-n junction 110 through ohmic contacts 202a and 202b. Therefore, establishing a bias voltage ($V_{heat}$) between heater via groups 204a and 204b will cause current to flow between these two groups, directly heating n-doped wing 110a of junction 110. P-doped wing 110b is heated similarly by establishing a bias voltage ($V_{heat}$) between via groups 204c and 204d. Together, this direct heating of p-n junction 110 results in thermo-optic phase shifting of light traveling through waveguide 108. Situating the heater on both sides of the waveguide keeps a constant voltage drop across the p-n junction along the length of the modulator, is more power- and space-efficient, and helps achieve the required thermal tuning range. It is possible to have the heater on only one side, though modulation efficiency would be reduced. $V_{heat}$ is a constant in this embodiment, such that when this voltage is applied between heater via groups 204a and 204b (and between heater via groups 204c and 204d), direct current flows between these via groups.

A separate bias voltage ($V_{bias}$) and an RF voltage ($V_{RF}$) are applied across N+ and P+ RF ohmic contact via groups 206a and 206b, which are also electrically connected to p-n junction 110 through ohmic contacts 202a and 202b. $V_{bias}$ is used to set the operating point for p-n junction 110 and to ensure the junction does not go into forward bias, while $V_{RF}$ generates the high-speed modulation signal for the light traveling though waveguide 108. Varying $V_{RF}$ causes current to temporarily flow in one direction or the other transversely across the waveguide in the conventional manner of a p-n junction operated in reverse bias mode. By maintaining zero heater voltage transversely across waveguide sections (for example, by applying $V_{heat}$ to both via groups 204a and 204c), operation of the heater through application of $V_{heat}$ does not disrupt operation of the high-speed modulator, because the voltage difference across any transverse section of p-n junction 110 remains the same (at $V_{bias}+V_{RF}$) through the entire length of the phase shifter. (In terms of total voltage, the voltages applied on the two heater sections are different, in order to provide the appropriate $V_{bias}$ across the RF phase shifter. That is, the base voltage difference across 204a and 204c, and across 204b and 204d, is $V_{bias}$, whereas the difference between 204a and 204b, and between 204c and 204d, is $V_{heat}$. One way to achieve this is by applying $V_{heat}+V_{bias}$ to 204a, $V_{bias}$ to 204b, $V_{heat}$ to 204c, and zero voltage to 204d.) Although more generally a thermal phase shifter could be electrically separated from the high-speed electro-optic phase shifter, for instance by being built into a resistor running parallel to the waveguide or on a different metal layer, the thermal phase shifter in this design is the resistor formed by conductive interconnect layers 101-104 as well as p-n junction 110; it is thus electrically integrated with the RF phase shifter, making this a dual-use RF and thermal phase shifter.

Figure 3C:
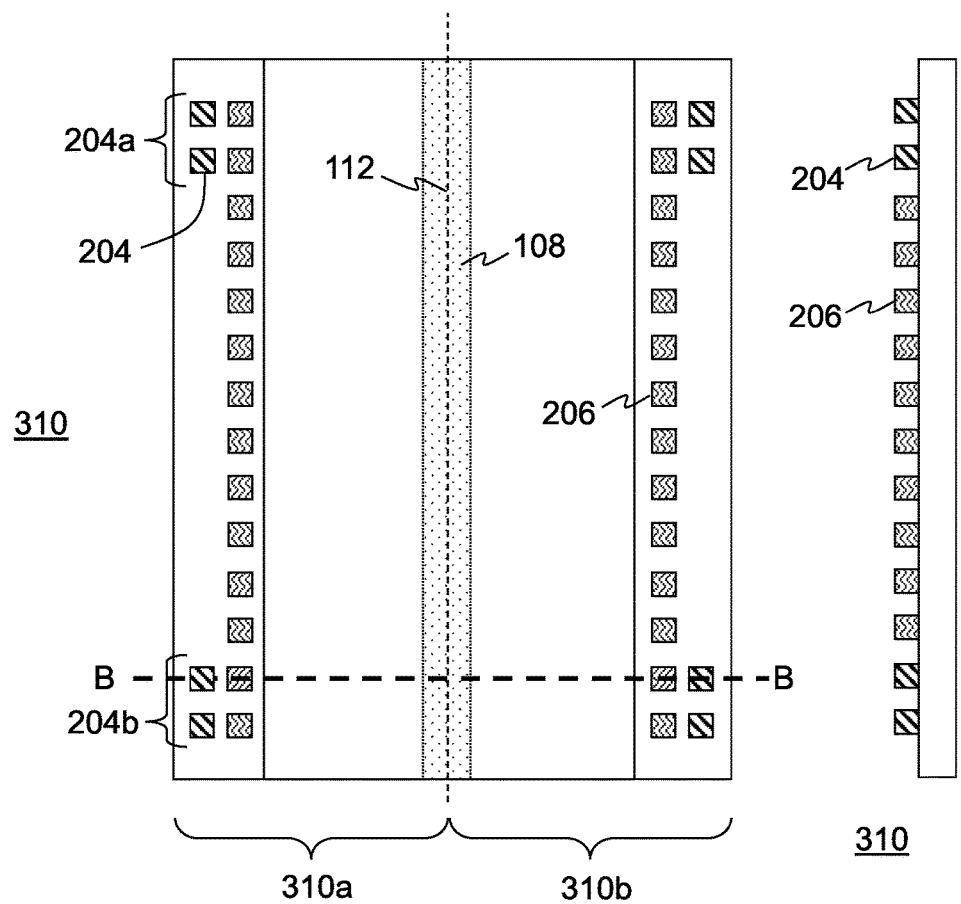
FIG. 3C is a transverse cross-sectional view of the second embodiment semiconductor structure.
Figure 3C:
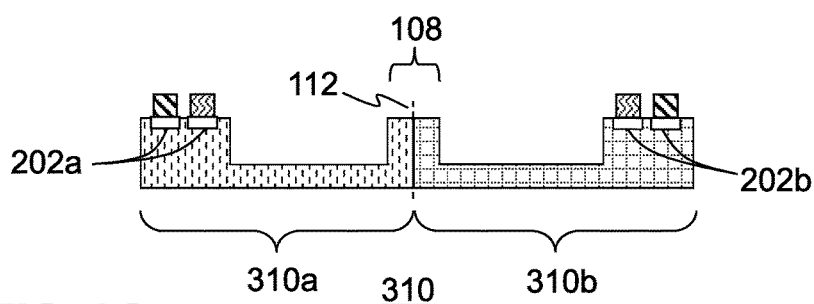

Shown in FIGS. 3A, 3B, and 3C are top, side, and cross-sectional views, respectively, of p-n junction 310, with the cross-section in FIG. 3C corresponding to cut line B-B in FIG. 3A. P-n junction 310 includes n-doped wing 310a and p-doped wing 310b, and represents a slight variation on the embodiment of the previous Figures. In this embodiment, heater contact vias 204 are positioned just laterally to RF contact vias 206, but otherwise remain directly integrated with junction 310 and function the same way as described above for the previous embodiment. Alternatively, the heater contact vias could be positioned just centrally to the RF contact vias. In the embodiments represented in each of the preceding sets of Figures, thermo-optic and electro-optic modulation is performed by a single, non-differentiated structure that combines the functions of a thermo-optic modulator and an electro-optic modulator while still enabling them to be controlled independently.

Figure 4A:
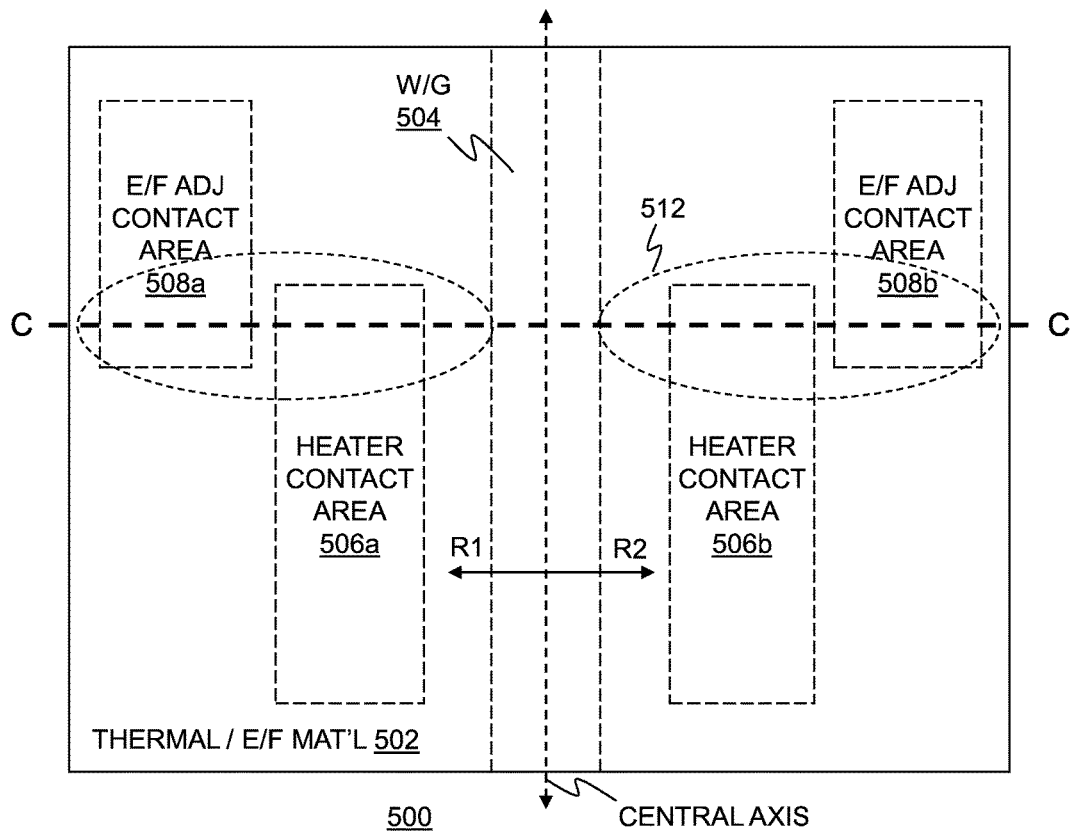
FIG. 4A is an orthographic plan view of a third embodiment semiconductor structure according to the present invention.
Figure 4B:
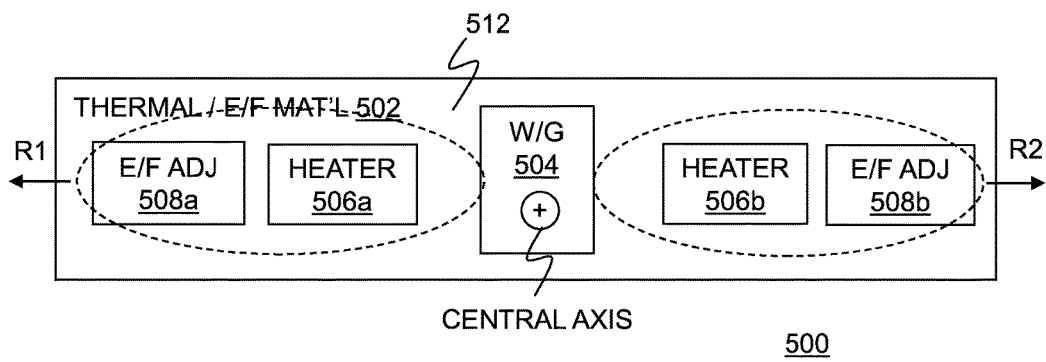
FIG. 4B is a transverse cross-sectional view of the third embodiment semiconductor structure.

Shown in FIG. 4A and 4B are top and cross-sectional views, respectively, of structure 500, with the cross-section in FIG. 4B corresponding to cut line C-C in FIG. 4A. Structure 500 includes: thermal and electric-field communication medium material 502; waveguide 504; heater contact areas 506a and 506b; electric-field adjustment contact areas 508a and 508b; and communication overlap areas (common transmission portions) 512, all shown with respect to a central axis and radial directions R1 and R2. Thermal and electric-field adjustments are communicated through thermal and electric-field communication medium material 502, as identified by communication overlap areas 512, to the same portion of waveguide 504. Because material 502 is electrically conductive such that thermal and electric-field adjustment contact areas 506a and 508a and 506b and 508b are electrically coupled, and because thermal and electric-field adjustments are performed over shared portions 512 of material 502, this is a dual-use thermal and electric-field adjuster.

Figure 5A:
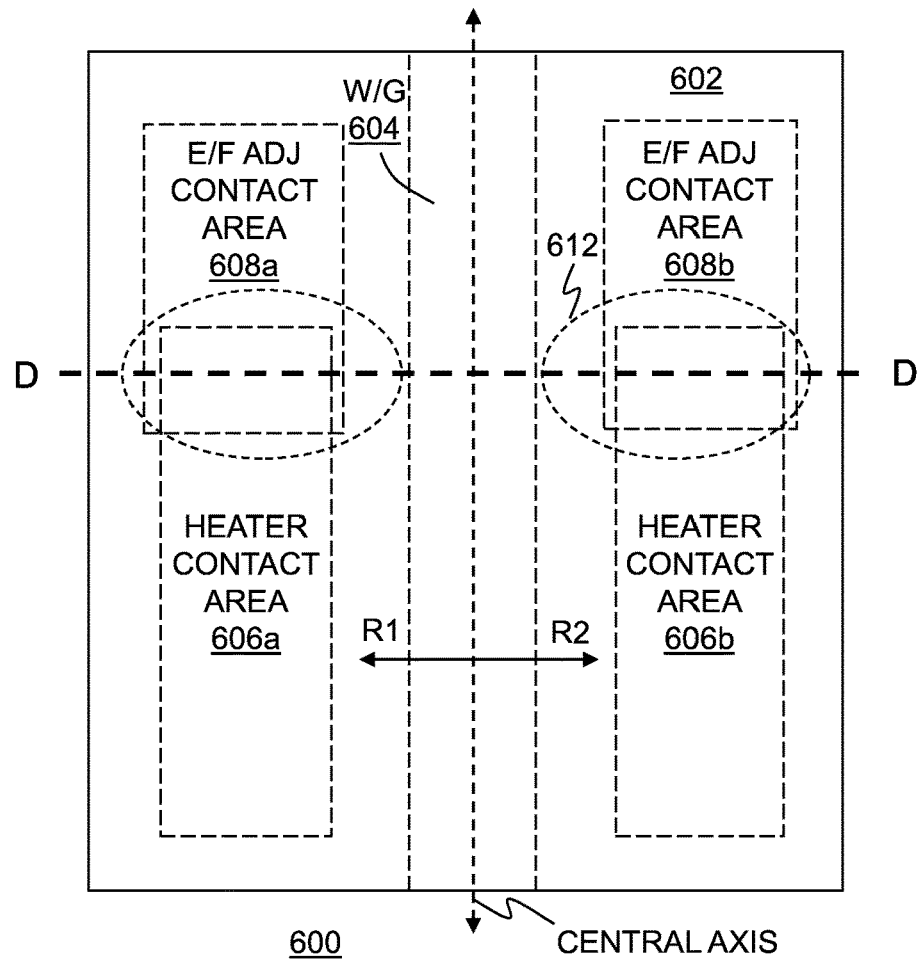
FIG. 5A is an orthographic plan view of a fourth embodiment semiconductor structure according to the present invention.
Figure 5B:
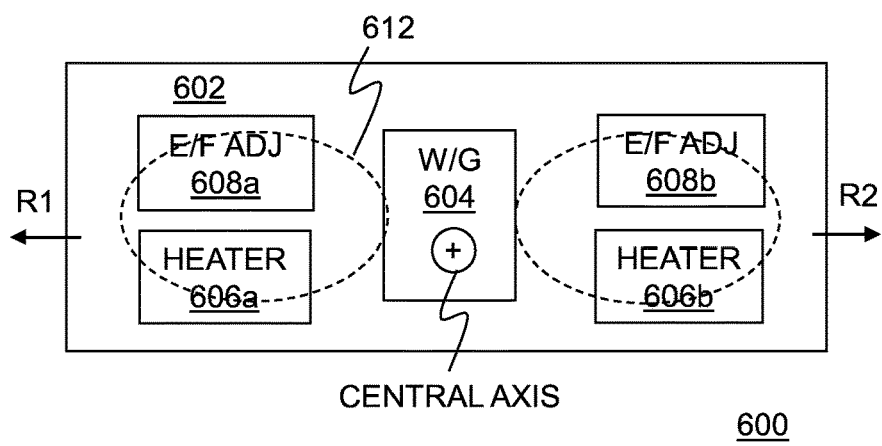
FIG. 5B is a transverse cross-sectional view of the fourth embodiment semiconductor structure.

Shown in FIGS. 5A and 5B are top and cross-sectional views, respectively, of structure 600, with the cross-section in FIG. 5B corresponding to cut line D-D in FIG. 5A. Structure 600 includes: thermal and electric-field communication medium material 602; waveguide 604; heater contact areas 606a and 606b; electric-field adjustment contact areas 608a and 608b; and communication overlap areas (common transmission portions) 612, all shown with respect to a central axis and radial directions R1 and R2. As in the embodiment of FIGS. 4A and 4B, thermal and electric-field adjustments are communicated directly through thermal and electric-field communication medium material 602, as identified by communication overlap areas 612, to the same portion of waveguide 604. The difference here is that heaters 606a and 606b and electric-field adjustment areas 608a and 608b are positioned above and below one another rather than being positioned medially and laterally, but, as in FIGS. 4A and 4B, they remain partially coextensive with respect to their shared channels of communication and their impact on a common portion of the waveguide. As with material 502 of FIGS. 4A and 4B, material 602 is electrically conductive such that thermal and electric-field adjustment contact areas 606a and 608a and 606b and 608b are electrically coupled. Being electrically integrated in this way and with thermal and electric-field adjustments performed over shared portions 512 of material 502, this a dual-use thermal and electric-field adjuster.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. For example: (i) the waveguide and modulating devices may include or be based on other materials, such as germanium or graphene or elements or compounds from other periodic table groups, and/or may include a linear electro-optic modulator such as lithium niobate, or potentially strained silicon or some other material, with a waveguide having a material with a substantial linear electro-optic effect; (ii) doping density gradients may be continuous or abrupt; (iii) other symmetric or asymmetric junction dimensions and/or modulating components may be used; (iv) other junction and/or waveguide types which operate on the same or different physical principles may be used, including p-i-n junctions or MOS diodes; (v) different types of modulation may be used, such as modulation of frequency or amplitude; (vi) carrier and modulating signal frequencies may vary across the frequency range of the electromagnetic spectrum; (vii) heater contact vias need not necessarily be at or only at the ends of the dual-use phase shifter structure but could for instance be interleaved with the electro-optic contact vias; (viii) the waveguide and/or junction or portions thereof may be linear or bent (for instance, such that the top view in FIG. 2A makes an arc, such as for use in a ring modulator, and/or such that the side view in FIG. 2B makes an arc), and/or may twist around the cylindrical axis defined by the waveguide; (ix) the waveguide may be of a rib, strip, slab, or other type, and may or may not maintain a constant cross-section along the direction of propagation; (x) each junction wing could wrap radially through some angle perpendicular to the waveguide axis; and/or (xi) the dual-use phase shifter need not be used only with ring modulators/ring resonator notch filters but may be used in other modulator types (including but not necessarily limited to MZIs, multi-ring modulators, and ring-assisted MZI modulators). The terminology used herein was chosen to best explain the principles of the embodiment, the practical application or technical improvement over technologies found in the marketplace, or to enable others of ordinary skill in the art to understand the embodiments disclosed herein.

The following paragraphs set forth some definitions for certain words or terms for purposes of understanding and/or interpreting this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar caution apply to the term "embodiment."

and/or: inclusive or; for example, A, B "and/or" C means that at least one of A or B or C is true and applicable.

Electrically connected: means either directly electrically connected, or indirectly electrically connected, such that intervening elements are present; in an indirect electrical connection, the intervening elements may include components such as capacitors, inductors and/or transformers.

Mechanically connected: Includes both direct mechanical connections, and indirect mechanical connections made through intermediate components; includes rigid mechanical connections as well as mechanical connection that allows for relative motion between the mechanically connected components; includes, but is not limited to, welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Light: electromagnetic radiation anywhere along the electromagnetic spectrum.

Radio frequency (RF): a frequency in the range of 3 kHz to 300 GHz.

Physically integrated and unitary piece of a single material: includes a non-homogenous piece of material in the sense that different areas of the piece may be doped with different dopants, different combinations of dopants, and/or may be doped to different degrees.

What is claimed is:

1. A device comprising:
   a waveguide, the waveguide being configured to communicate light;
   a first heater and a second heater, the first heater and the second heater being configured to heat at least a first portion of the waveguide in a controlled manner, wherein the heating of at least the first portion of the waveguide results in thermo-optic phase shifting;
   a radio frequency (RF) phase shifter incorporated into a ring modulator structure, wherein a first plurality of heater contact vertical interconnect accesses (VIAs) of the first heater are laterally positioned in parallel to a first plurality of RF contact VIAs of the RF phase shifter on a first wing and a second plurality of heater contact vertical interconnect accesses (VIAs) of the second heater are laterally positioned in parallel to a second plurality of RF contact VIAs of the RF phase shifter on a second wing surrounding the waveguide, and wherein the first and the second plurality of heater contact VIAs laterally positioned in parallel to the first and the second plurality of RF contact VIAs form a single structure that includes the first and the second heater and the RF phase shifter; and
   thermal/electric-field communication medium material, wherein the thermal/electric-field communication medium material includes the first heater positioned below a first portion of the RF phase shifter on the first wing of the ring modulator structure and the second heater positioned below a second portion of the RF phase shifter on the second wing of the ring modulator structure, the thermal/electric-field communication medium material being configured to:
   thermally communicate heating from the first heater to the first portion of the waveguide on the first wing and the second wing surrounding the first portion of the waveguide, through the plurality of heater contact VIAs on a shared portion of the thermal/electric-field communication medium material, and
   communicate electric field adjustments from the RF phase shifter to the first portion of the waveguide on the first wing and the second wing surrounding the first portion of the waveguide, through the plurality of RF contact VIAs on the shared portion of the thermal/electric-field communication medium material;
   wherein:
   the first heater is electrically coupled to the RF phase shifter and the first heater and the RF phase shifter are independently controlled.

2. The device of claim 1 wherein the first portion of the waveguide and the thermal/electric-field communication medium material are formed as a physically integrated and unitary piece of a single material.

3. The device of claim 2 wherein the single material forming the first portion of the waveguide and the thermal/electric-field communication material is doped silicon.

4. The device of claim 1 wherein:
   the first portion of the waveguide defines a central axis, an axial direction and a 360 degree range of radial directions; and
   the thermal/electric-field communication medium extends from the first portion of the waveguide in at least a first radial direction.

5. The device of claim 4 wherein the thermal/electric-field communication medium extends from the first portion of the waveguide in at least a second radial direction.

6. The device of claim 5 wherein the first radial direction and the second radial direction are opposed about the central axis.

7. The device of claim 1 wherein:
   the first portion of the waveguide defines a central axis, an axial direction and a 360 degree range of radial directions;
   the first electric-field adjustment hardware set is spaced apart from the central axis in one, or more radial direction(s); and
   the first heater is spaced apart from the central axis in one, or more, radial direction(s).

8. The device of claim 7 wherein:
   the first heater is elongated in an elongation direction; and
   the elongation direction is at least substantially parallel to the central axis.

9. The device of claim 1 wherein:
   the first portion of the waveguide defines a central axis, an axial direction and a 360 degree range of radial directions; and
   the central axis is at least substantially shaped as an arc of a circle.

10. The device of claim 1, wherein the plurality of heater contact VIAs and the plurality of RF contact VIAs extend from a first end of the thermal/electric-field communication medium material to a second end of the thermal/electric-field communication medium material.

11. The device of claim 1, wherein the plurality of heater contact VIAs and the plurality of RF contact VIAs extend in parallel to the waveguide from a first end of the thermal/electric-field communication medium material to a second end of the thermal/electric-field communication medium material.

12. A device comprising:
a waveguide, the waveguide being configured to communicate light;
a first heater and a second heater, the first heater and the second heater being configured to heat at least a first portion of the waveguide in a controlled manner; and
a radio frequency (RF) phase shifter incorporated into a ring modulator structure, wherein a plurality of heater contact vertical interconnect accesses (VIAs) of the first heater are positioned at a first end of thermal/electric-field communication medium material on a first wing, a plurality of heater contact vertical interconnect accesses (VIAs) of the second heater are positioned at the first end of thermal/electric-field communication medium material on a second wing, and a plurality of RF contact VIAs of the RF phase shifter at a second end of the of thermal/electric-field communication medium material, and wherein the plurality of heater contact VIAs, the plurality of RF contact VIAs, and the thermal/electric-field communication medium material form a single structure, and
wherein:
the thermal/electric-field communication medium material includes the first heater positioned above a first portion of the RF phase shifter on the first wing of the ring modulator structure and the second heater positioned above a second portion of the RF phase shifter on the second wing of the ring modulator structure, the thermal/electric-field communication medium material being configured to:
thermally communicate heating from the first heater to the first portion of the waveguide, through the plurality of heater contact VIAs on a shared portion of the thermal/electric-field communication medium material, and
communicate electric field adjustments from the RF phase shifter to the first portion of the waveguide, through the plurality of RF contact VIAs on the shared portion of the thermal/electric-field communication medium material.

13. The device of claim 12, wherein the first heater is electrically coupled to the RF phase shifter and the first heater and the RF phase shifter are independently controlled.

14. The device of claim 13, wherein the plurality of heater contact VIAs and the plurality of RF contact VIAs extend in parallel to the first portion of the waveguide.

* * * * *